United States Patent Office 3,420,058
Patented Jan. 7, 1969

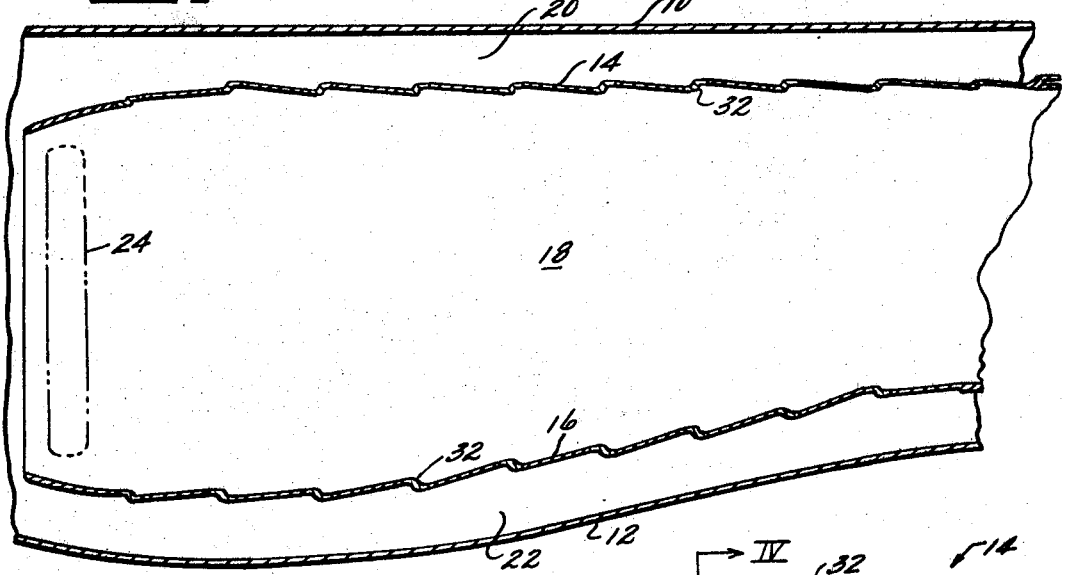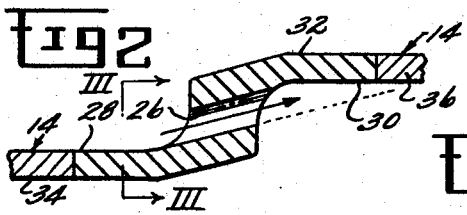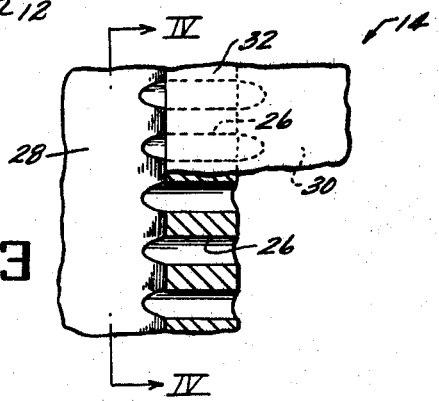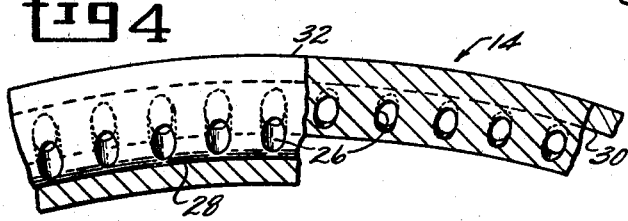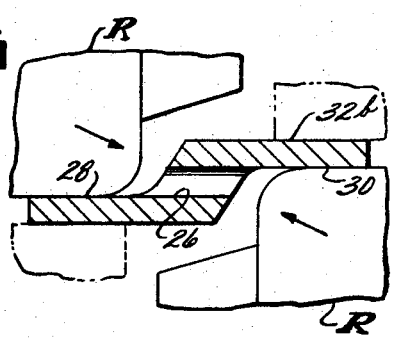

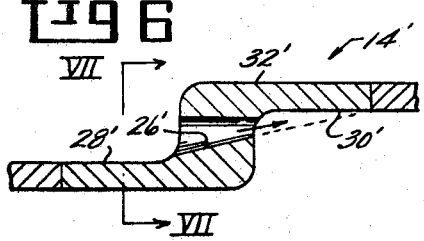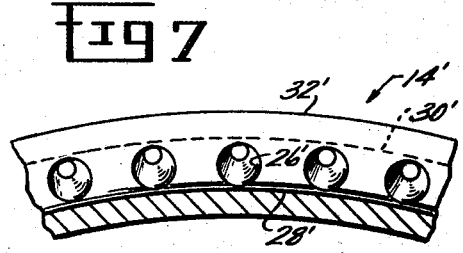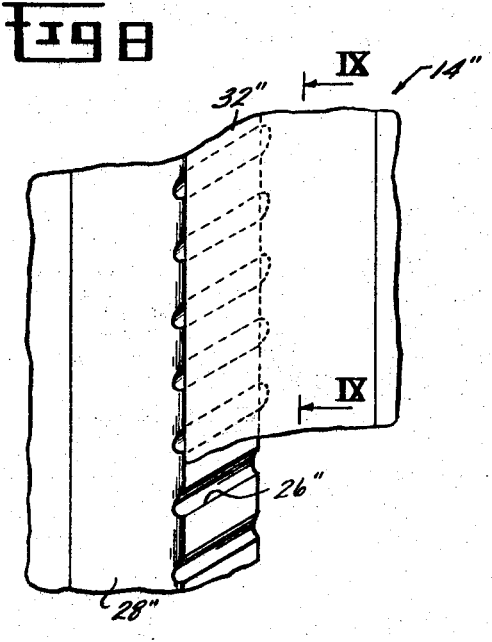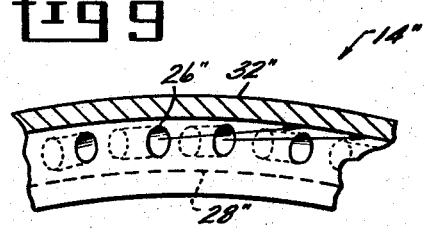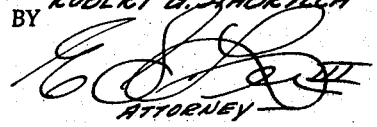

3,420,058
COMBUSTOR LINERS
Werner E. Howald and Robert G. Stabrylla, Cincinnati, Ohio, assignors to General Electric Company, a corporation of New York
Filed Jan. 3, 1967, Ser. No. 606,753
U.S. Cl. 60—39.66    7 Claims
Int. Cl. F02c 7/18

ABSTRACT OF THE DISCLOSURE

A combustor liner construction which has cooling passageways formed in stepped portions thereof. The cooling passageways are discrete holes having a diameter between .015 and .095 inch and are spaced apart a distance of 2–6 diameters. The holes are angled to discharge the cooling air against the adjacent downstream surface of the liner. A method of fabricating such angled holes by a coining operation is described.

---

The present invention relates to improvements in combustors particularly adapted for use in generating hot gas streams, as in gas turbine engines.

Gas turbine engines conventionally generate a hot gas stream which is discharged through a nozzle to provide a propulsive force or otherwise employed to obtain an energy output. In these and other engines for the propulsion of aircraft it is particularly important that the component parts be of minimum weight and dimension in order to obtain a maximum thrust to weight ratio for the engine.

One object of the invention is to attain these desired ends for aircraft engines by improving combustors employed in the generation of hot gas streams therefor.

Conventional combustors may be of the annular or cannister type, and in either type there is provided inner and outer casings which are spaced from liners in which combustion is maintained. Fuel and primary air are introduced into the combustor to support combustion therein. Air is also introduced into the combustor from the space between the casings through holes spaced along the length of the combustor. This further air serves the purpose of cooling the liner to prevent it from being quickly burnt out.

Conventional liner constructions require such large quantities of cooling air that it is necessary to utilize the cooling air as secondary combustion air. This, in turn, has necessitated a relatively long combustor in order to complete the combustion process and a consequent limitation on the minimum length and weight of the combustor itself. Further, the use of large amounts of secondary combustion air prevents attainment of stoichiometric combustion or nearly stoichiometric combustion which would give maximum thrust output from the gas stream.

A further problem encountered with the common type of liner construction, which employs partially telescoped cylindrical sections interconnected by convoluted "wiggle" strips, has been a lack of accuracy in the control of the amount of cooling air or secondary air, as well as a relatively short life at high performance conditions.

Another object of the invention is to improve the effectiveness with which combustor liners are cooled and thereby enable a closer approach to stoichiometric combustion.

Yet another object of the invention is to improve the structural integrity of combustor liners.

The use of air for cooling combustor liners necessarily implies that there are no known materials which are capable of withstanding the heat generated in the combustion chamber and yet capable of maintaining structural integrity for an appreciable length of time. From this it would be evident that combustor liners are formed of alloys specially formulated to meet the requirements of a high temperature environment. Such alloys are relatively heavy and further contribute to the overall weight of the combustor. In large combustors, as in augmented turbofan engines, the weight factor becomes of particular importance, as was previously noted.

Titanium and beryllium have been found to be unique materials for use in aircraft engines, providing high strength and light weight. However, they do not have the heat resistance capabilities of other metals and alloys.

Accordingly, a further object of the invention is to enable the economic use of titanium, beryllium or other similar metals as a combustor liner material.

The environment of the invention is thus in a combustor liner in the form of a shell having an outer surface defining a plenum for pressurized cooling air and an inner surface defining a combustion chamber. The liner shell has circumferential stepped portions spaced along its length.

Holes extend through the stepped portions to provide cooling air for the inner liner surface.

One aspect of the invention is found in the provision of discrete holes through the stepped portions which have a diameter between .015 and .090 inch which are spaced apart, around the stepped portion, a distance of 2–6 diameters.

Another aspect of the invention is in the provision of holes through the stepped portions which are inclined at an angle to the inner surface downstream of the inclined portions, whereby the cooling air is effectively impinged against the surface to be cooled. Advantageously these holes are in the form of nozzles to accelerate the air as it passes to the hot inner surface of the liner. Alternatively, where the inner surface of the liner is concave, the holes through the stepped portions may be disposed tangentially to the inner surface and at an angle to the axis about which the surface is generated.

Another aspect of the invention is found in a method of forming a combustor liner wherein cylindrical, relatively short (axially) stepped blanks are drilled with holes through the stepped portions essentially parallel with and intermediate the cylindrical flange surfaces on either side thereof. These blanks are then coined to displace the offset stepped flanges towards each other and thereby incline the holes relative to these inner and outer surfaces. The stepped portions are then joined by butt welding or the like to generally cylindrical portions to generally form a combustor liner.

The above and other related objects and features of the invention will be apparent from a reading of the following description of the disclosure found in the accompanying drawings and the novelty thereof pointed out in the appended claims.

In the drawings:

FIGURE 1 is a longitudinal section of a combustor embodying the present invention;

FIGURE 2 is an enlarged view of a fragmentary portion of a combustor liner seen in FIGURE 1;

FIGURE 3 is a section taken in part on line III—III in FIGURE 2;

FIGURE 4 is a section taken on line IV—IV in FIGURE 3;

FIGURE 5 is a view illustrating the method of forming a portion of the combustor liner seen in FIGURES 2–4;

FIGURE 6 is a view similar to FIGURE 2 illustrating a modified embodiment of the invention;

FIGURE 7 is a section taken on line VII—VII in FIGURE 6;

FIGURE 8 is a view similar to FIGURE 3 illustrating another modified embodiment of the invention; and FIGURE 9 is a section taken on line IX—IX in FIGURE 8.

The combustor seen in FIGURE 1 is of the so-called annular type, comprising cylindrical outer and inner casings 10 and 12 and liners 14 and 16 in the form of shells which define an annular combustion zone 18 and annular plenums 20 and 22 for pressurized cooling air. Fuel is introduced and combustion initiated at a nozzle structure 24 at the inlet end of the combustor. In gas turbine engines the inlet end of the combustor is connected to the discharge of an axial flow compressor which provides pressurized primary air for supporting combustion of fuel as well as pressurized air for the plenums 20 and 22. The combustion of fuel generates a hot gas stream which is discharged from the opposite, or downstream, end of the combustor and, in the case of a gas turbine engine, would pass through a turbine for driving the axial flow compressor.

The liners 14 and 16 are of a stepped construction to provide for the passage of cooling air from the plenums 20 and 22 along the interior surfaces thereof. Circumferentially arranged rows of holes 26 pass through these stepped portions to effectively provide for the cooling of the inner surfaces of the liner, as will now be described in detail with reference to FIGURES 2–4.

A fragmentary portion of one of the stepped portions in the outer liner 14 is shown in these figures. The outer liner surface, defining the plenum 20, is designated at 28 and the inner liner surface, defining the combustion zone 18, is designated at 30. Preferably the stepped portion is formed as a separate element designated at 32 which is secured by a butt joint, as by diffusion welding, to cylindrical portions 34, 36, on opposite sides thereof.

The holes 26 are preferably arranged so that the cooling air passing therethrough impinges against the inner surface of the liner downstream thereof. Thus in FIGURE 2 it will be seen that the holes 26, which are of circular cross section, are inclined or angled toward the inner surface 30 as they pass through the stepped portion 32. It is also preferred that the holes 26 have a diameter between .015 and .090 inch and that they be spaced apart a distance of 2–6 diameters. The cooling effectiveness of the described arrangement of holes enables the liners 14 and 16 to be formed of titanium. FIGURE 5 illustrates an advantageous method for forming the stepped portion 32. A cylindrical blank $32_b$ is formed with offset rims of different diameters and a body portion angled toward the outer rim. The holes 26 are then drilled and/or otherwise formed in this body portion essentially parallel the axis of the blank and intermediate the offset rims. Thereafter coining rollers R may be displaced in the direction shown by the arrow to swage the stepped portion to the configuration seen in FIGURES 2–4.

FIGURES 6 and 7 illustrate a modified embodiment of the invention in which holes 26' are in the form of conical nozzles whose axes are inclined toward the inner surface 30. Not only is this arrangement effective in impinging the cooling air against the inner surface 30, but it also accelerates the cooling air for greater effectiveness.

The modified embodiment of the invention seen in FIGURES 8 and 9 illustrates another way of obtaining impingement of substantially all the cooling air against the inner surface 30 where the inner surface is concavely curved, as in the case of the outer liner 14. In this instance the cooling holes 26'' are formed essentially tangentially of the inner surface 30 and inclined at an angle to the axis of revolution of the surface 30. Thus, as the cooling air is discharged from the holes 26'', it will progressively encounter the concavely curved surface 30 and impinge thereagainst to provide an effective cooling action.

Holes are also provided through the stepped portions of the inner liner 16 to provide for impingement of substantially all of the cooling air on the inner surfaces of that liner as well, in accordance with the description given above, with the exception that the modified form of the invention of FIGURES 8 and 9 is not applicable to the convexly curved inner surface of that liner.

The described size and spacing of the cooling holes as well as their inclination towards the inner surface of the liner has been found highly effective in minimizing the amount of cooling air introduced into the combustion chamber. This, in turn, has permitted substantially all of the air employed for combustion to be introduced at the combustor 24 which thus enables stoichiometric combustion to be closely approached.

Various modifications of the described embodiment will occur to those skilled in the art and the scope of the invention is therefore to be derived solely from the following claims.

Having thus described the invention, what is claimed as novel and desired to be secured by Letters Patent of the United States is:

1. In a combustor employed in generating a hot gas stream,
   liner means comprising a relatively thin shell having inner and outer surfaces respectively defining a combustion zone and a plenum for pressurized cooling air,
   said liner shell having circumferential stepped portions spaced along its length,
   said stepped portions having holes therethrough which are angled toward said inner surface downstream of the stepped portion for impingement of cooling air thereon.

2. A combustor as in claim 1 wherein,
   the holes through the stepped portions have their axes disposed generally to the axis of the shell.

3. A combustor as in claim 1 wherein,
   the axes of the holes are disposed in planes lying on a tangent, relative to the cylindrical form of the shell, and the axes of the holes are angled relative to the axis of the shell.

4. A combustor as in claim 1 wherein,
   the holes have a diameter between .015 and .090 inch and are spaced apart 2–6 diameters.

5. A combustor as in claim 1 wherein,
   the holes are in the form of nozzles which accelerate the air as it is discharged toward said inner surface.

6. A combustor as in claim 1 wherein,
   the stepped portions comprise relatively short elements bonded to cylindrical elements to form the shell.

7. In a combustor employed in generating a hot gas stream,
   liner means comprising a shell having inner and outer surfaces respectively defining a combustion zone and a plenum for pressurized cooling air,
   said liner shell having circumferential stepped portions spaced along its length,
   said stepped portions having holes therethrough which are parallel with the inner surface of the liner downstream of said stepped portion,
   said holes having a diameter between .015 and .090 inch and being spaced apart around said stepped portion a distance, relative to their axes, of 2–6 diameters.

References Cited

UNITED STATES PATENTS

| 2,573,694 | 11/1951 | DeZubay et al. | 60—39.65 |
| 2,658,337 | 11/1953 | Clarke et al. | 60—39.65 XR |
| 2,699,648 | 1/1955 | Berkey | 60—39.65 |

FOREIGN PATENTS

| 743,149 | 1/1956 | Great Britain. |

JULIUS E. WEST, *Primary Examiner.*

U.S. Cl. X.R.

29—455; 60—39.69

UNITED STATES PATENT OFFICE
CERTIFICATE OF CORRECTION

Patent No. 3,420,058

January 7,

Werner E. Howald et al.

It is certified that error appears in the above identified patent and that said Letters Patent are hereby corrected as shown below:

Column 4, line 34, after "generally" insert -- parallel --.

Signed and sealed this 10th day of March 1970.

(SEAL)
Attest:

Edward M. Fletcher, Jr.
Attesting Officer

WILLIAM E. SCHUYLER, JR.
Commissioner of Patents